United States Patent

[11] 3,627,109

| [72] | Inventor | Richard E. Cabak<br>3295 Golden Orchard Drive, Mississauga, Ontario, Canada |
|------|----------|---|
| [21] | Appl. No. | 859,475 |
| [22] | Filed | Sept. 19, 1969 |
| [45] | Patented | Dec. 14, 1971 |

[54] CONVEYOR CONSTRUCTION
10 Claims, 7 Drawing Figs.

[52] U.S. Cl. .................................................. 198/137, 198/181
[51] Int. Cl. ........................................................ B65g 15/00
[50] Field of Search ............................................. 198/195, 196, 137, 181, 202

[56] References Cited
UNITED STATES PATENTS

| 2,753,983 | 7/1956 | Bloomer | 198/196 |
| 2,818,965 | 1/1958 | Horth | 198/137 X |
| 3,117,668 | 1/1964 | Weihle, Jr. et al. | 198/181 |

FOREIGN PATENTS

| 1,217,270 | 5/1966 | Germany | 198/195 |

Primary Examiner—Richard E. Aegerter
Assistant Examiner—H. S. Lane
Attorney—Robert M. Dunning ABSTRACT: A conveyor includes a series of connected overlapping plates capable of traveling along a tortuous path which may be curved about a vertical axis. The plates are equipped with frustoconical rollers having their larger diameters lowermost and pivotally supported to the plates on generally vertical axes. A channel-shaped track has a wall shaped to the contour of the rollers to maintain the conveyor in place and reduce friction.

INVENTOR
RICHARD E. CABAK
BY Robert M. Dunning
ATTORNEY

INVENTOR
RICHARD E. CABAK
BY Robert M. Dunning
ATTORNEY

CONVEYOR CONSTRUCTION

This invention relates to an improvement in conveyors and deals particularly with a conveyor capable of following a tortuous path or track.

BACKGROUND OF THE INVENTION

Certain plastic conveyors have been produced for following tortuous paths. Most such conveyors are relatively narrow in width, and have flat plates designed to form a discontinuous belt for supporting the articles to be conveyed. Such belts are usually formed of completely molded one-piece links, each link having projecting portions which overlap portions of the next link, and are pin connected thereto. Other such conveyors are made embodying side bow chains which are actually link chains connected by pins which are sufficiently loose so that the chain can follow a curved path, One of the problems with conveyors of this type lies in the fact that they tend to leave the track when pulled around a horizontal radius unless the conveyors are provided with laterally projecting lungs or some other means which engage in opposed channels on opposite sides of the track to hold the chains in place. While conveyors of this type have been successfully made for a considerable period of time, they are very expensive because of the necessary interengagement between the tracks and the links. What is perhaps most important, however, is the ordinary day-to-day cost of driving the conveyors. As the conveyor chains travel about the horizontal curve, the pull upon the chains causes the interengaging portions of the chains to frictionally engage the rails, tracks or other supporting means. As a result, in order to drive conveyors of this type, the power supplied must be considerably higher than would be required to drive a straight conveyor. Furthermore, when friction of this type is generated, there is inevitably wear caused by the friction, and the life of the conveyors is accordingly materially reduced.

Most of the chains which have been made in the past to serve as conveyors capable of traveling a tortuous path have supporting plates which are curved or tapered in plan so that the plates can travel around the horizontal curves without engaging one another. In doing this, the area of the surface on which the goods being supported and conveyed is materially reduced.

SUMMARY OF THE INVENTION

An object of the present invention is to eliminate previous difficulties experienced with conveyor chains and conveyors which must carry goods about horizontal curves. Most importantly, it is a feature of the present invention to provide a conveyor including a side bow chain on which the conveyor plates are mounted, and including means for very materially reducing the friction as the conveyor moves about a horizontal curve. By materially reducing the friction between the conveyor chains and their supporting tracks and rails, the everyday cost of operating the conveyor is materially reduced. At the same time, the cost of replacements due to wear is also greatly reduced.

A feature of the present invention resides in the provision of a conveyor including a series of plastic plates which are connected to, and driven by, chain links. The plastic plates are provided with a pair of spaced-parallel frustoconical rollers mounted on vertical pivots on opposite sides of the chain link. These rollers are arranged with their small diameter ends uppermost and their larger diameter ends lowermost. In traveling along a straight path, these rollers serve mainly to hold the chain centrally located in its supporting track. However, in curves of the conveyor, the track is provided with a side rail shaped to conform to the taper of the rollers. These rollers engage the inclined side rail, greatly reducing friction and eliminating the tendency for the conveyor to jump out of its supporting tracks.

A further feature of the present invention resides in the shape of the plastic plates. The upper portion of each plate are generally chevron shaped while the lower portion of each plate has one edge which is straight and an opposite edge which is generally V-shaped, tapering in width from the apex at the center of the plate to the outer edge of the plate. As the plates travel along a straight path, there are shallow triangular notches between adjoining links in the upper surfaces of the plates, these notches being closed by the overlapping lower portions of the plate. When traveling around a bend of minimum radius, both the upper and lower surfaces of the inner end of adjoining plates are in side-by-side relation, while larger triangular notches are provided between the upper surfaces of the other or outer ends of the plates. However, the proportions are such that the plates overlap from end to end in all positions thereof.

These and other objects and novel features of the present invention will be more clearly and fully set forth in the following specification and claims.

DESCRIPTION OF THE PREFERRED EMBODIMENT

Figure 1:
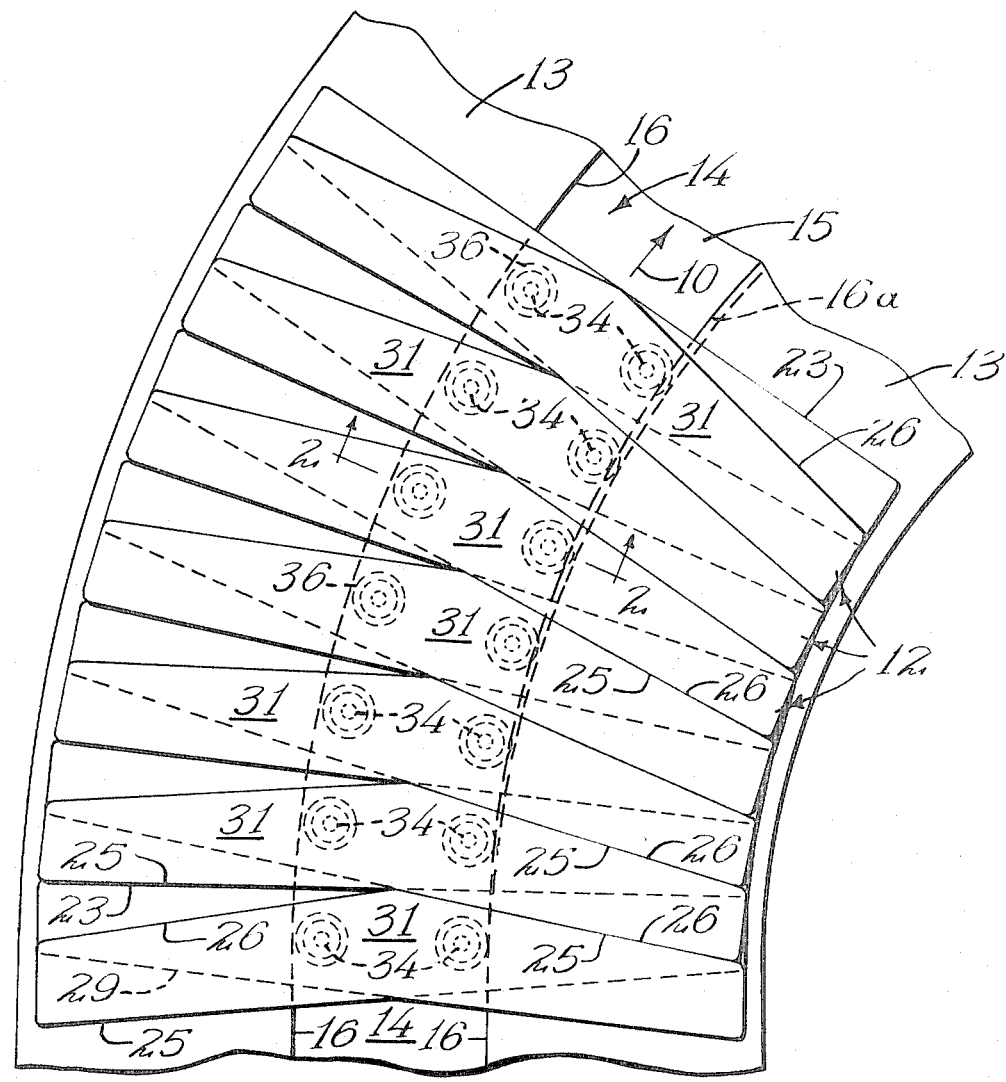
FIG. 1 is a top plan view of a portion of a conveyor showing the position of the links and plates as the conveyor bends in a horizontal plane.
Figure 3:
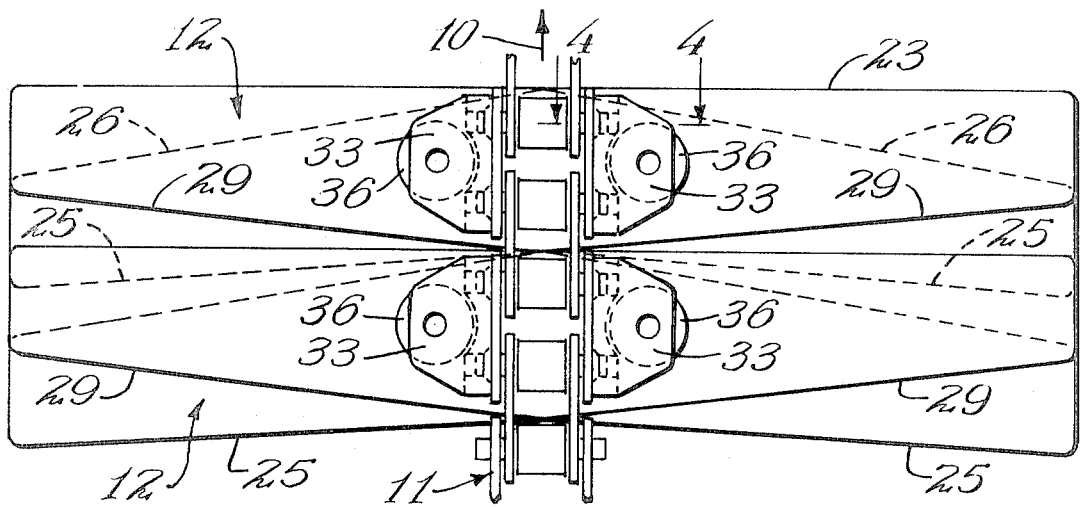
FIG. 3 is a bottom plan view of a pair of links.

In the following descriptions, the conveyor will be described as moving in the direction of the arrow 10 shown in FIGS. 1 and 3 of the drawings. This is merely for the purpose of description, as the conveyor can move equally well in either direction.

In general, the conveyor includes a side bow chain which is indicated in general by the numeral 11, and a series of overlapping plates which are indicated in general by the numeral 12. The plates 12 are supported either by a table 13 or by suitable rails. In the arrangement illustrated, the plates are supported on a table 13 having a channel-shaped track 14 therein designed to accommodate the chain 11. The channel 14 also accommodates means such as rollers supported beneath the plates 12, and which will be described. In straight sections of the conveyor, the channel-shaped track includes a bottom portion 15 parallel to the table 13 and connected thereto by parallel channel sides 16 as indicated in FIG. 4 of the drawings.

Figure 7:
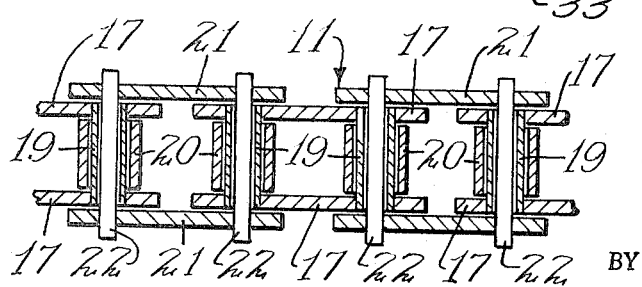
FIG. 7 is a sectional view through a portion of the side bow chain.

As shown in FIG. 7, the side bow conveyor chain 11 is generally conventional, each link including a pair of parallel sideplates 17 which are connected in parallel relation by a pair of sleeves 19. Rollers 20 encircle the sleeves 19 and are free to rotate thereabout. The links are connected by a pair of parallel connecting plates 21 which are connected by pins 22 extending through the sleeves 19. The pins 22 are somewhat smaller in diameter than the inner diameter of the sleeves 19 so that the pins 22 may extend angularly to the axis of the sleeves 19 when the conveyor is traveling around a curve. The pins 22 support the plates 21 spaced apart a distance slightly greater than the distance between the outer surfaces of the link plates 17 so that the connecting plates 21 will not bind against the plates 17. The structure shown in FIG. 7 is not novel but is illustrated to indicate the type of chain used to permit the conveyor to bend.

Figure 4:
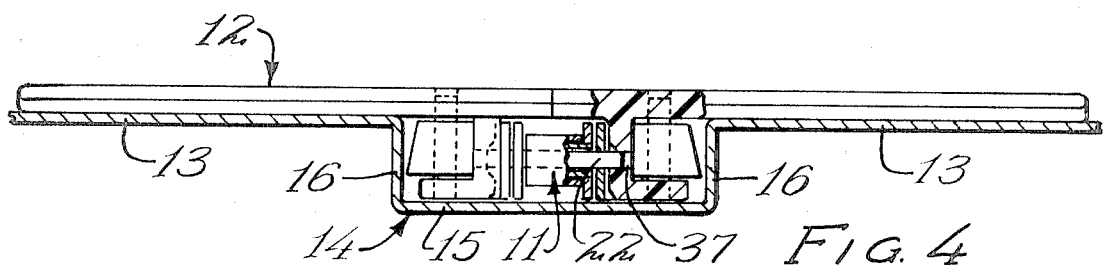
FIG. 4 is a vertical sectional view through the supporting track in a straight section of the conveyor, and through a portion of a chain link, the position being indicated by line 4—4 of FIG. 3.
Figure 5:
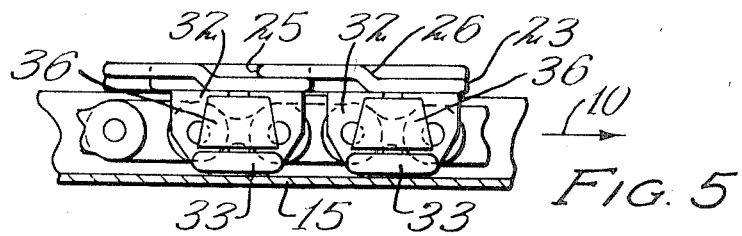
FIG. 5 is a side elevational view of a pair of links, a portion of the supporting rail being broken away to disclose the link rollers.
Figure 6:
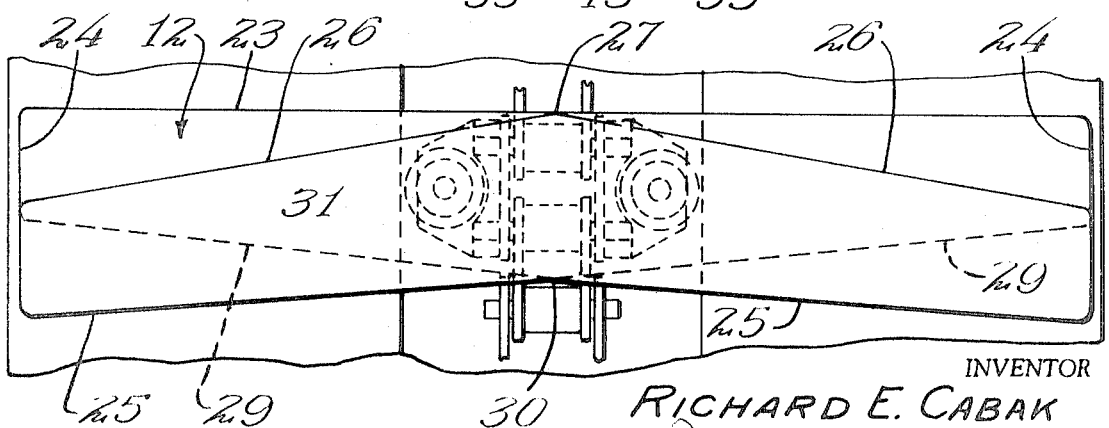
FIG. 6 is a top plan view of a single plate and its associated chain link.

The conveyor plates 12 are constructed as is perhaps best illustrated in FIGS. 4 and 6 of the drawings. As indicated in FIG. 6, each plate 12 includes a straight forward edge 23 extending between the parallel ends 24 of the plates. The rear edges 25 of the plates 12 are slightly V-shaped in form, the ends 24 of the plates being of greater axial length than the center portions. The plates 12, while of integral form, may be considered to comprise two layers of material, these two layers being connected by a generally diamond-shaped area of full thickness. The diamond-shaped area is defined by forwardly directed inclined surfaces 26 which incline rearwardly from the central apex 27, and which extend to the side edges 24. The rear edges 29 of the diamond-shaped area also incline toward an apex 30 at the center of the plate, and directly behind the apex 27. The diamond-shaped area 31 formed by the lines 26 and 29 forms a reinforcement for the center portion of each blade. At the same time, this arrangement provides a structure in which the blades always overlap to some extent even while traveling around a horizontal curve. The rear edges 25 are also in angular relation and meet at the apex 30. Thus the upper layer of each plate is chevron shaped in plan while the underlayer has a straight forward edge and a generally V-shaped rear contour, the widest part of the underlayer being at the center of each blade, and the narrowest part of this layer being at the ends 24.

The slant of the rear edges 25 of the upper layer of each blade is just sufficient so that the blades will slightly overlap at their ends when traveling about a curve. As will be noted in FIG. 1 of the drawings, when the conveyor is traveling about a horizontal curve, one end of each blade may be in contact with the next adjoining blade. Thus the conveyor has a solid continuous surface on the inner side of the curve, and the plates may be spread apart twice the normal distance on the outer side of the curve. At the same time, the plates are so arranged and so proportioned that they remain in substantially overlapped condition throughout their length while traveling about a curve.

Figure 2:
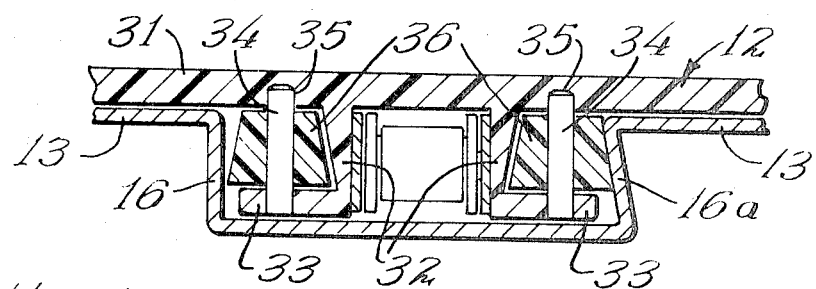
FIG. 2 is a vertical sectional view through a portion of the conveyor, the position of the section being indicated by the line 2—2 of FIG. 1.

As is indicated in FIGS. 2 and 4 of the drawings, each conveyor plate 12 is provided with a downwardly extending flange 32 on either side of center and equally spaced from the longitudinal center of each plate. The downwardly extending flanges 32 support horizontally extending flanges 33 which extend substantially parallel to the surfaces of the plates 12. The flanges 33 extend outwardly from the lower ends of the vertical flanges 32 and are generally parallel to the plates 12. Pivot pins 34 extend vertically through the flanges 31 and into sockets 35 in the plates 12. These pivot pins 34 support rollers 36 which are of frustoconical shape. The rollers 36 have their larger diameter ends lowermost, and their smaller diameter ends uppermost. The flanges 32 are arcuately notched to accommodate this type of roller.

The purpose of this arrangement is show in FIG. 2 of the drawings. When the conveyor is traveling about a corner or a curve, as shown in FIG. 1, one wall 16a of the channel 14, which forms the inner or smaller radius wall of the curve is inclined with respect to the vertical so as to fit the taper of the rollers 36. As a result, as the conveyor travels about a curve, the taper of the frustoconical rollers 36 fits against the taper of the wall 16a of the channel 14 holding the conveyor in place within the channel. As a result the pull upon the conveyor which would normally tend to disengage the conveyor from its track exerts a force drawing the surface of the rollers 36 on the inner side of the conveyor against the wall 16a and the conveyor is prevented from leaving its guiding channel. As will be understood, the conveyor plates, due to their length, are held in a generally horizontal position, and the force drawing the successive plates around the curve draws the rollers 36 on one side of the plates against the inclined wall 16a, preventing any disengagement of the conveyor from its supporting channel.

When the conveyor is traveling along a straight path, the rollers 36 serve mainly to center the intermediate portion of the conveyor in its channel and to eliminate friction between the conveyor in its channel and its support. However, when the conveyor is traveling about a curve, the frustoconical rollers on one side of the conveyor, which is on the smaller diameter radius of curvature, engage against the inclined wall 16a and act to guide the conveyor smoothly about the radius of curvature. The angle is sufficient so that the pull upon the chain cannot pull the conveyor from its supporting channel. Any tendency for the conveyor to rise in its supporting channel is opposed by the angle of the supporting track side 16a. As a result, the conveyor will travel smoothly about its path, and the various plates will remain in proper position during this operation.

The chain 11 is connected to the plates 12 by means of the pins 22. These pins extend beyond the connecting plates 21 and into apertures 37 in the downwardly extending flanges 32. The inner plates 17 and sleeves 19 are free to pivot within limits relative to the outer connecting plates 21 and pins 22.

The chains 11 are not an essential part of the present invention. Blocks of plastic or metal may be used to connect adjoining plates 12, and may be loosely pinned thereto, as by the pins 22, the ends of which extend into apertures 37 in the vertical flanges 32 of the plates 12. Such blocks may be spaced sufficiently to accommodate the teeth of a sprocket therebetween.

I claim:
1. A conveyor including:
   a generally channel-shaped track, a supporting means on opposite sides of said track,
   a conveyor chain supported for movement longitudinally of said channel-shaped track,
   a series of supporting plates connected to said chain for movement therewith, said plates extending laterally from said chain and supported by said supporting means,
   a downwardly extending flange on at least certain of said plates on one side of said chain,
   a lateral flange on said downwardly extending flange in spaced relation to said supporting plate to which it is secured and extending in a direction away from said chain,
   a roller supported on a pivot which is generally normal to supporting plate and said lateral flange and supported thereby to extend therebetween,
   said roller being frustoconical form with the large diameter end lowermost, and
   said track having an inclined side shaped to conform with said rollers.
2. The structure of claim 1 and in which similar rollers are supported on opposite sides of said connecting means.
3. The structure of claim 1 and in which said rollers are supported by each of said plates.
4. The structure of claim 1 and in which said plates are in overlapping relation.
5. a conveyor including;
   a series of plates,
   means connecting said plates in a manner to permit angularity therebetween on a vertical axis and on a horizontal axis,
   a generally channel-shaped track supporting said plates,
   a roller supported by certain of said plates on a vertical axis on one side of said connecting means,
   said roller being of frustoconical form with the large diameter end lowermost, and
   said track having an inclined side shaped to conform with said rollers, said plates including one edge on one level and an opposite edge on a different level, the said one edge of each plate overlapping the said other edge of an adjoining plate.
6. The structure of claim 5 and in which said plates are wider at their ends than at their center point.
7. The structure of claim 5 and in which each said plate includes a generally diamond-shaped central portion extending substantially the lateral width of said plates, said diamond-shaped portion being equal in thickness to both said edges and from which said edges project.

8. The structure of claim 7 and in which said edges of said plates are generally triangular in shape, tapering outwardly from points adjoining the transverse center of said diamond-shaped portion to the transverse ends thereof.

9. The structure of claim 1 and in which said chain is supported between the downwardly extending flange on one side of said chain and a similar downwardly extending flange, lateral flange and roller on the other side of said chain.

10. A conveyor including:
   a series of plates,
   means connecting said plates in a manner to permit angularity therebetween on a vertical axis and on a horizontal axis,
   a generally channel-shaped track supporting said plates,
   a roller supported by certain of said plates on a vertical axis on one side of said connecting means,
   said roller being of frustoconical form with the large diameter end lowermost, and
   said track having an inclined side shaped to conform with said rollers,
   a pair of downwardly extending flanges on said plate to which said connecting means is secured, and
   opposed outwardly projecting flanges on said downwardly extending flanges, and in which said roller is supported on a pivot extending from one of said outwardly projecting flanges and said plate.

* * * * *